Figure 1:
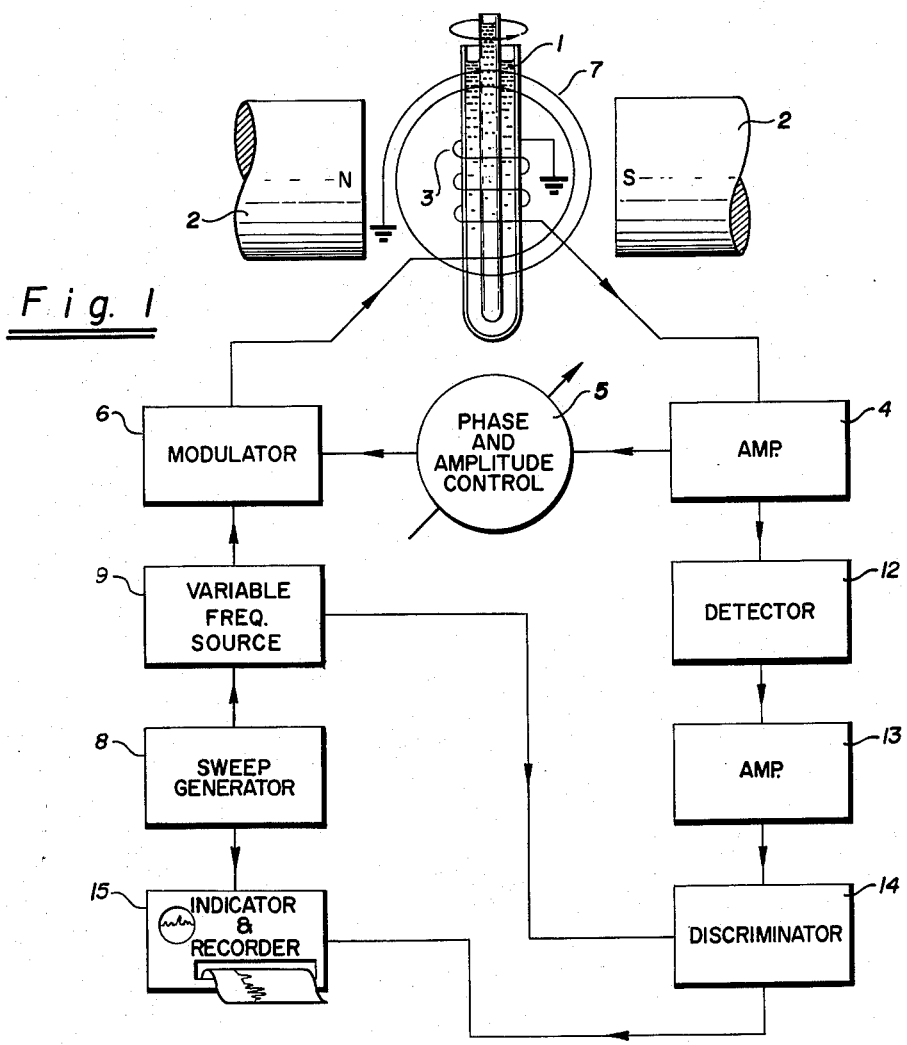

INVENTOR.
Weston A. Anderson

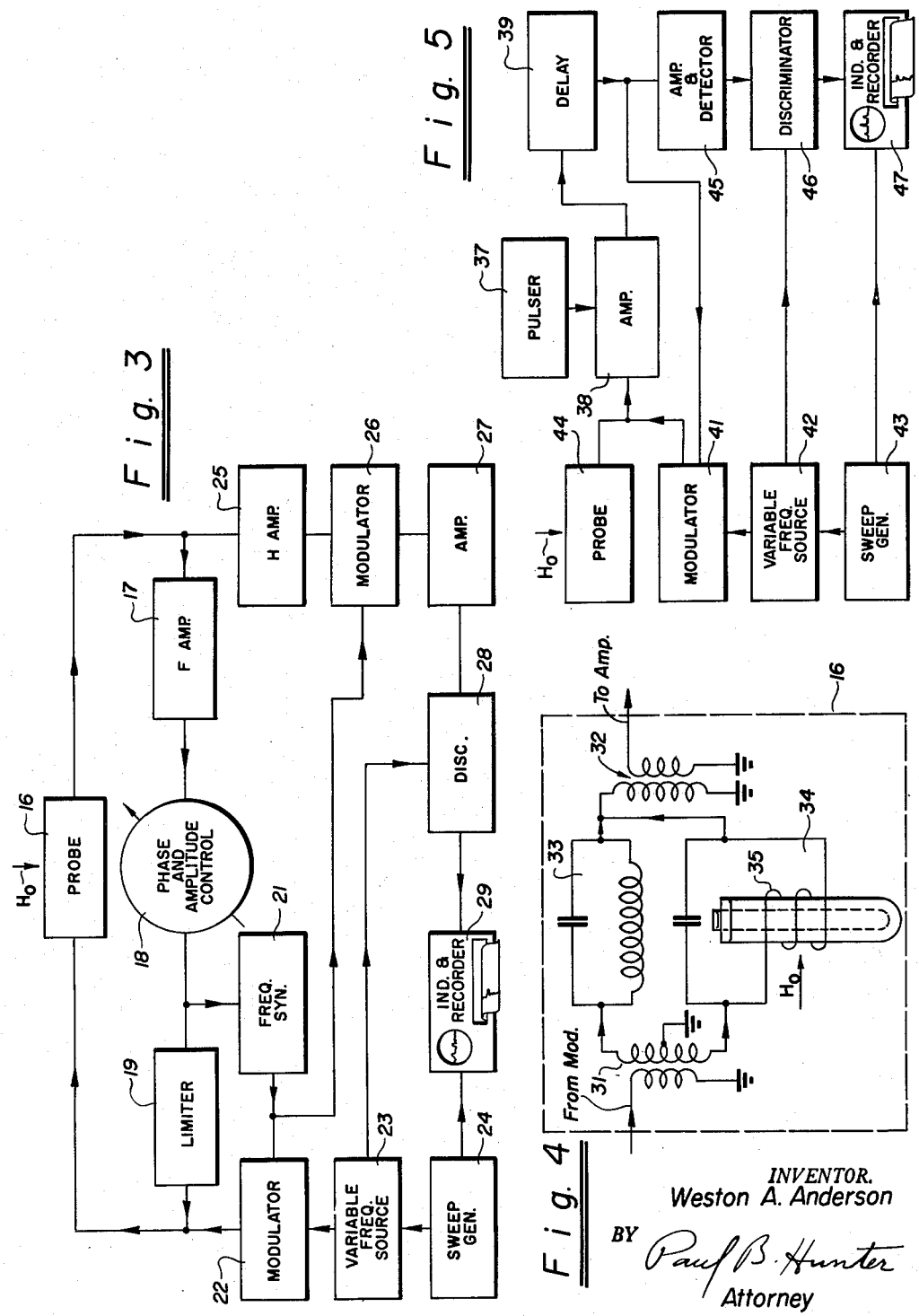

United States Patent Office

3,085,195
Patented Apr. 9, 1963

---

3,085,195
GYROMAGNETIC RESONANCE METHODS AND APPARATUS
Weston A. Anderson, Palo Alto, Calif., assignor to Varian Associates, Palo Alto, Calif., a corporation of California
Filed July 11, 1957, Ser. No. 671,307
15 Claims. (Cl. 324—.5)

The present invention relates in general to gyromagnetic methods and apparatus and more particularly to a novel method and apparatus for improving the time stability and resolution of gyromagnetic resonance apparatus useful for chemical analysis, process control, precise measurement of magnetic fields and other uses.

The present invention is an improvement relating to a previous invention described in a co-pending U.S. application of Russell H. Varian et al., entitled "Gyromagnetic Resonance Methods and Apparatus," Serial No. 606,820, filed August 29, 1956, and assigned to a common assignee of the present application. This prior invention provides and claims method and apparatus for obtaining reliable and precise gyromagnetic data by greatly improving the time stability of gyromagnetic resonance equipment. Briefly, the increased time stability was obtained by immersing two groups of gyromagnetic bodies in a polarizing magnetic field. Resonance of one of the groups of gyromagnetic bodies was produced and a signal derived therefrom for application to the second group to produce resonance thereof. The resonance of the second group of gyromagnetic bodies was then detected and indicated and recorded, as desired. This system gives enhanced stability because the two groups of gyromagnetic bodies will respond in the same manner to changes in the magnetic environment. More specifically, small random fluctuations in the polarizing magnetic field are compensated for by corresponding corrective fluctuations in the resonant frequency of the two groups of gyromagnetic bodies such that any difference in the resonance of the two groups of gyromagnetic bodies remains a constant in a random fluctuating environment.

In the prior art system described above the two groups of gyromagnetic bodies were spatially separated in the magnetic field such that the resonant frequency of one group could be varied as desired such as, for example, by varying the polarizing magnetic field over one of the groups without affecting the other group. In this manner gyromagnetic spectra could be produced by sweeping the resonant frequency of the first group through the resonant frequency of the second group.

When the two groups of gyromagnetic bodies are disposed at separate locations within the polarizing magnetic field several problems are introduced. One of these problems resides in the additional apparatus needed for providing a separate probe for the two groups, each probe having the necessary transmitter and receiver coils therein. In addition, a larger region of very homogeneous magnetic field must be provided to contain the two sample volumes. Moreover, slight random fluctuations encountered in the polarizing magnetic field may not be identical in the two separate regions thereby introducing slight errors in the gyromagnetic spectra produced therefrom.

The present invention provides a novel gyromagnetic method and apparatus wherein the two groups of gyromagnetic bodies are immersed in a polarizing magnetic field such that a substantial number of the same magnetic flux lines that pass through one group also pass through the second group thereby obviating the difficulties encountered with spaced-apart samples.

The principal object of the present invention is to provide a novel improved gyromagnetic resonance method and apparatus for enhancing the time stability and resolution of gyromagnetic resonance apparatus.

One feature of the present invention is the provision of two groups of gyromagnetic bodies disposed in a region of polarizing magnetic field having a substantial number of the same magnetic flux lines permeating both groups. Sustained resonance of one group of gyromagnetic bodies is produced to provide a signal for heterodyning with a variable frequency source to produce a variable frequency side band signal. The side band signal is applied to the second group of gyromagnetic bodies to produce resonance therein, as desired, thereby enhancing the time stability and resolution of the gyromagnetic apparatus.

Another feature of the present invention is the provision of means for comparing the detected side band excited resonance signal with the signal from the variable frequency source to produce a D.C. signal in variable accordance with the detected resonance, which may be indicated or recorded, as desired.

Another feature of the present invention is the provision of a two-compartment concentric sample holder for containing there-within at least two separate groups of gyromagnetic bodies, one of which may be utilized for the signal source of a gyromagnetic oscillator, the other group serving as the sample under analysis. The concentric sample holder serves to prevent the intermixing of the two groups of gyromagnetic bodies whereby a standard reference group of gyromagnetic bodies may be utilized without introducing errors due to coupling between the two groups of gyromagnetic bodies.

Another feature of the present invention is the provision of a control group of gyromagnetic bodies physically intermixed with the sample group of gyromagnetic bodies such that both groups of gyromagnetic bodies "see" the same identical random fluctuations in both the applied driving A.C. magnetic field as well as the D.C. polarizing magnetic field.

Another feature of the present invention is the provision of limiter means associated with the circuit loop of the gyromagnetic oscillator for preventing saturation of the reference group of gyromagnetic bodies to thereby improve the stability of the apparatus.

Another feature of the present invention is the provision of a reference group of gyromagnetic bodies having a gyromagnetic ratio substantially different than the gyromagnetic ratio of the groups of bodies under analysis. Frequency synthesizer means is included for producing a reference gyromagnetic oscillator derived signal having a frequency in close proximity to the frequency of the gyromagnetic bodies under analysis whereby minute fluctuations in the polarizing magnetic field and other environment will produce substantially the same change in the gyromagnetic resonance frequency of both the synthesized reference signal and the resonance signal of the groups under analysis.

Another feature of the present invention is the provision of a novel pulse system for gyromagnetic analysis including the foregoing features of the present invention.

Figure 2:
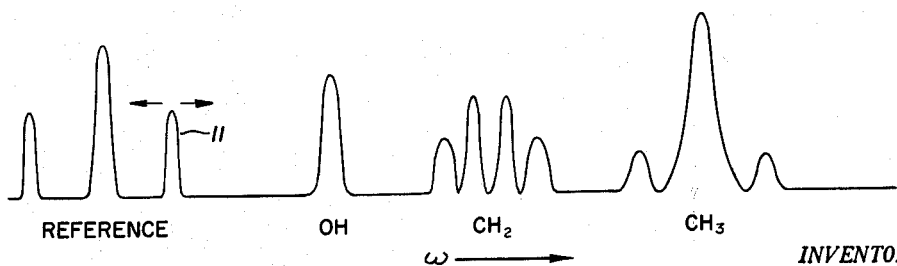

These and other features and advantages of the present invention will be more apparent after a perusal of the following specification taken in connection with the accompanying drawings wherein, FIG. 1 is a schematic block diagram of the novel gyromagnetic resonance apparatus of the present invention, FIG. 2 is a simulated gyromagnetic resonance spectrum in the frequency domain indicating resonance of several groups of gyromagnetic bodies and including the reference and side band signals, FIG. 3 is a schematic block diagram of a novel gyromagnetic resonance apparatus of the present invention, FIG. 4 is a schematic circuit diagram of a probe assembly of the present invention, and FIG. 5 is a schematic block diagram of a novel gyromagnetic resonance apparatus of the present invention.

Referring now to FIG. 1 at least a first and second group of gyromagnetic bodies having different gyromagnetic resonance frequencies as of, for example, hydrogen nuclei in benzene ($C_6H_6$) and hydrogen nuclei in ethyl alcohol ($CH_3CH_2OH$), respectively, are disposed in a first and second compartment, respectively, of a concentric sample holder 1. The sample holder 1 including the first and second groups of gyromagnetic bodies is disposed within a polarizing magnetic field produced by magnet 2. A detector coil or A.C. field receiving structure 3 is positioned in surrounding relationship to the first and second groups of gyromagnetic bodies and has its longitudinal axis substantially at right angles to the polarizing magnetic field. The detector coil 3 is coupled to the input of an amplifier 4. The output of the amplifier 4 is fed to a phase and amplitude control 5, thence to a modulator 6. The output of the modulator 6 is fed to a transmitter coil 7 positioned in close proximity to the first and second gyromagnetic bodies and with its axis substantially at right angles to both the polarizing magnetic field and the axis of the detector coil 3.

In operation, noise signals which are present in the input of amplifier 4 are amplified therein and fed via phase and amplitude control 5 and modulator 6 to the transmitter coil 7 and thereby applied to the two groups of gyromagnetic bodies. One component of the noise will be at the resonant frequency of the first or control group thereby producing resonance therein. The gyromagnetic resonance is detected in detector coil 3 and fed to the input of amplifier 4. This resonance signal is then amplified and reapplied via phase and amplitude control 5 and modulator 6 to the first and second groups of gyromagnetic bodies. The phase and amplitude control 5 is adjusted to produce sustained oscillation of the first or control group of gyromagnetic bodies which should preferably have a resonance signal of the largest amplitude. Thus in this manner a gyromagnetic oscillator is provided which oscillates at the frequency of the control sample and maintains a constant controlled ratio between the oscillator frequency and the magnetic field intensity, the output of which is applied to the second group of gyromagnetic bodies under analysis. The term "gyromagnetic oscillator," as used herein, is defined to mean an amplifier having an input and output circuit regeneratively coupled together through the intermediary of a gyromagnetic substance. Thus, minute random fluctuations in the polarizing field intensity $H_0$, where a magnetic polarizing magnetic field is used, cause corresponding corrective fluctuations in the frequency $\omega$ of the gyromagnetic oscillator.

A sweep generator 8, either through mechanical linkage or via electrical signals, as desired, serves to sweep the frequency of a variable frequency source 9 at a prescribed rate over a certain band of frequencies. The signal obtained from the variable frequency source 9 is applied to the input of modulator 6 wherein it serves to modulate the frequency of the gyromagnetic oscillator to produce an upper and a lower side band signal in addition to the gyromagnetic oscillator carrier signal. The side band signals thus created maintains a stable controlled ratio between its frequency and the polarizing magnetic field intensity and will be swept in frequency about the center carrier frequency in variable accordance with the sweep generator signal.

In a preferred embodiment the reference or control frequency of the gyromagnetic oscillator is displaced to one side in frequency such as, for example, to the lower side of the gyromagnetic resonance spectra of the sample under analysis which may, for example, be ethyl alcohol (see the spectrum shown in FIG. 2). As the frequency of the variable frequency source 9 is changed in variable accordance with the signal derived from the sweep generator 8, the upper side band signal 11 will be swept through the ethyl alcohol spectrum. At certain frequencies the frequency of the upper side band signal 11 will coincide with the resonant frequency of a particular group of gyromagnetic bodies contained within the ethyl alcohol sample such as, for example, the protons in the OH group.

When the reference side band signal frequency coincides with the resonance frequency of a particular group within the sample under analysis, resonance will be produced in that particular group of gyromagnetic bodies. This resonance signal is detected in the A.C. field receiving structure or detector coil 3 and fed to the input of amplifier 4. In the absence of gyromagnetic resonance of the sample under analysis, the side band signal will not appear in the input of amplifier 4 because the transmitter coil is highly decoupled from the detector coil 3 due to its right angular positioning and due to other decoupling means, not shown, which are utilized and are well-known in the art.

Thus the side band excited resonance signal, if any, which is present in the output of amplifier 4 is fed to a detector 12 along with the carrier wherein they are heterodyned to produce sum and difference frequencies. The low frequency difference signal is then detected and fed to an amplifier 13 wherein it is amplified and thence fed to the input of a discriminator or phase sensitive detector 14. A signal corresponding to the frequency of the variable frequency source 9 is also fed to the input of the discriminator 14 and compared with the low frequency difference signal obtained from amplifier 13 to produce a D.C. signal indicating the resonance of a particular group within the sample under analysis. The D.C. signal is then fed to indicator and recorder 15 wherein it is indicated and/or recorded as a function of the sweep signal obtained from sweep generator 8 to produce a gyromagnetic resonance spectrum as shown in FIG. 2.

Thus far the present invention has been described using a coaxial sample holder containing both a reference or control group of gyromagnetic bodies and a sample under analysis. The use of the dual compartment sample holder and the requirement of a separate reference sample is not necessary. More specifically, in another embodiment of the present invention a single strong resonance line within the spectrum of the sample of matter under analysis is utilized as the reference group of bodies for the gyromagnetic oscillator thereby dispensing with the separate reference sample. For example, if the sample of matter under analysis is ethyl alcohol as shown in FIG. 2, the gyromagnetic oscillator is adjusted to oscillate on the OH line. A spectrum is recorded in the manner as just described with regard to the dual sample using the hydrogen nuclei of the OH group as the reference carrier signal. Of course, the spectrum obtained in this manner does not accurately show the OH line corresponding to the carrier frequency. However, by adjusting the oscillator to oscillate on another strong line such as, for example, the center line of the $CH_3$ group, a spectrum is recorded including the OH group. The two spectra are superimposed to give the complete spectrum of the sample under analysis. Of course, the reference or control group could be added by mixing with the sample under analysis as, for example, mixing the reference or control sample benzene with the sample alcohol under analysis.

Referring now to FIG. 3 there is shown another embodiment of the present invention. In obtaining hydrogen nuclear gyromagnetic spectra for many hydrocarbon compounds it may be difficult to find a reference group of gyromagnetic bodies having a strong resonance disposed at one end of the gyromagnetic spectrum under analysis. In such a case it may be desirable to find a sample of matter having a strong resonance line which results from a reference group of gyromagnetic bodies having a different gyromagnetic ratio than the gyromagnetic ratio of the bodies under analysis. For example, when looking at the spectra of many of the hydrocarbons it may be desirable to utilize a sample having a strong fluorine resonance such as, for example, the fluorine nuclei of perfluorocyclobutane $C_4F_8$.

A small amount of additional circuit complexity is introduced when a reference group of gyromagnetic bodies is utilized having a substantially different gyromagnetic ratio than the group under analysis. More specifically, the amplifier utilized for amplifying the signal received from the probe may not have sufficient bandwidth to amplify both the reference gyromagnetic resonance signal and the resonance signals of the sample under analysis. One remedy for this situation is to provide separate amplifiers parallel connected to the probe, one for each band of frequencies.

For instance, in FIG. 3 the output of the detector coil 3, which is not shown but which, along with the transmitter coil 7 and sample holder 1, is included in the probe 16, is fed to the input of an amplifier 17 which serves to amplify the resonant frequency of the reference sample such as, for example, fluorine. The reference signal is then fed to phase and amplitude control 18 thence via a limiter 19 back to the input of the probe 16. In this manner a gyromagnetic oscillator is provided, the frequency of which is the gyromagnetic resonance frequency of the reference sample such as, for example, fluorine. The limiter 19 has been provided to prevent the gyromagnetic resonance line from becoming saturated. Frequency instabilities arise in the gyromagnetic oscillator due to the undesired resonance saturation effects when the magnet linewidth exceeds the natural linewidth of the reference line. This limiting function may be provided by either the limiter 19 or by saturation effects present in the amplifier 17 which serve to limit the amplitude of signals amplified therein.

A portion of the gyromagnetic oscillator output signal is derived therefrom and fed to the input of a frequency synthesizer 21. The frequency synthesizer may comprise, for example, fluorine-hydrogen division and multiplication stages whereby the gyromagnetic oscillator signal is first divided to a lower frequency such that by multiplying by an integer number in the multiplication stage the end frequency comes very close to being at one end of the gyromagnetic resonance spectrum of the sample under analysis. This is done so that small fluctuations in the polarizing magnetic field will produce substantially the same frequency change in the resonant frequencies of the gyromagnetic bodies under analysis and the synthesized signal. If the frequency synthesizer 21 were not provided, the minute fluctuation in the polarizing magnetic field would not produce substantially the same change in the resonant frequency of the sample under analysis and the side band signal thereby introducing an error.

The output of frequency synthesizer 21 is fed to a modulator 22 where it is heterodyned with a signal obtained from variable frequency source 23 to produce a desired side band signal. A sweep generator 24 serves to sweep the frequency of the variable frequency source 23 at a prescribed rate to thereby sweep the side band signal with respect to the carrier or gyromagnetic synthesized signal at said prescribed rate and over a certain band of frequencies. The spectrum of the sample under analysis is contained within the side band sweep range and, as the side band signal sweeps therethrough, it will excite resonances of the various groups of gyromagnetic bodies contained within the sample under analysis.

The side band excited resonances are then detected and fed to the input of an amplifier 25 wherein they are amplified and fed to the input of a modulator 26. Within the modulator 26 the side band excited resonance is heterodyned with the synthesized signal or the carrier frequency to produce sum and difference frequencies. The difference frequency is selected and amplified in amplifier 27 and thence fed to the input of a frequency discriminator 28 or phase sensitive detector. Within the discriminator 28 the difference signal is compared with a signal derived from the variable frequency source 23 to produce a D.C. signal in variable accordance with side band excited resonance of the various groups of gyromagnetic bodies contained within the sample under analysis. The D.C. resonance signal is then fed to an indicator and recorder 29 wherein it is indicated and recorded as a function of a signal derived from sweep generator 24 to thereby produce a gyromagnetic resonance spectrum of the sample under analysis.

Heretofore in FIGS. 1, 2 and 3 the present invention has been described as utilized with a crossed-coils gyromagnetic resonance detection apparatus and method. The present invention is not limited to the crossed-coils method for detection. More specifically, the single coil method and apparatus for resonance detection may be utilized for example, as depicted in FIG. 4 wherein the single coil probe system is shown as it would be utilized with the aforementioned embodiments of the present invention.

The single coil version of probe 16 includes a transformer 31 having the input from modulator 6 and/or 22 coupled to the primary thereof and the secondary of the transformer 31 having its center tap grounded and the other ends of the primary parallel connected to the primary of a second transformer 32 via two parallel resonant L-C circuits 33 and 34 forming two balanced arms of a bridge network. The inductive portion of one of the parallel resonant L-C circuits 34 includes a detector coil 35 surrounding the reference group and the gyromagnetic sample under analysis.

In the absence of resonance for any particular group of gyromagnetic bodies contained within the detector coil 35, the bridge will be perfectly balanced and no signals will appear across the primary of transformer 32. However, when resonance is produced in one of the groups of gyromagnetic bodies contained within the detector coil 35, the bridge will become unbalanced for that particular resonance frequency and a signal at that frequency will appear in the primary of transformer 32. This signal is then coupled to the secondary of transformer 32 and fed to the input of the first stage of amplification, as previously described. The systems as previously described in FIGS. 1 and 3 may interchangeably use a single coil system of FIG. 4 or the crossed coil system of FIG. 1, as desired.

A pulsed type of gyromagnetic resonance method and apparatus may be conveniently modified to incorporate the provisions of the present invention. A pulse system so modified is shown in FIG. 5.

Referring now to FIG. 5 a pulser 37 periodically energizes amplifier 38 for periods of finite duration, which period is followed by another finite period during which the amplifier is inoperative. To start the system, noise which is present in the input of amplifier 38 is amplified during the "on" period determined by pulser 37. The output of amplifier 38 is then fed to a suitable delay line 39 as of, for example, the quartz type wherein the noise or signal applied to the delay line is delayed for a period approximately equal to the time the amplifier is energized. The output of the delay line is then fed to the input of a modulator 41 wherein it is modulated with a signal derived from a variable frequency source 42 to produce upper and lower side band signals in addition to the carrier frequency.

A sweep generator 34 serves to vary the frequency of the variable frequency source 42 at a linear rate whereby the side band signals are varied in frequency at a linear rate about the carrier frequency. The carrier and side band signals appearing in the output of modulator 41 are then applied to a probe 44 which contains therewithin a reference group of gyromagnetic bodies and, in addition, a sample of matter under analysis.

At the time the carrier and side band signals, in the output of modulator 41, arrive at the probe 44 and therefore the input of amplifier 38, the amplifier has become de-energized and therefore the signals are not transmitted therethrough. However, the signals are applied to the probe 44 and will excite resonance of the strong reference line therein. During the interval of time in which the gyromagnetic bodies contained within the probe are being excited with the pulse of energy derived from amplifier 38 via delay 39 and modulator 41, the gyromagnetic bodies are undergoing forced precession in the polarizing magnetic field $H_0$.

However, when the pulse of energy derived from amplifier 38 is terminated, the gyromagnetic bodies continue to freely precess about the polarizing magnetic field thereby inducing a signal in the detector coil of the probe 44 which will be applied to the input of amplifier 38. It is during this free precession period that the pulser 37 re-energizes amplifier 38 to amplify the resonance signal of the reference group of gyromagnetic bodies. This reference signal is then suitably delayed in delay 39, modulated in modulator 41 with the signal derived from variable frequency source 43 to produce upper and lower side band signals which are then swept at a linear rate about the carrier or reference group of gyromagnetic bodies to produce successive resonances of the various groups of gyromagnetic bodies contained within the sample under analysis.

Thus it can be seen that the circuit loop including the pulser 37, amplifier 38, delay 39, modulator 41 and probe 44 enters into a pulse mode of gyromagnetic oscillation at the reference gyromagnetic resonance frequency, or carrier frequency. This carrier frequency is then heterodyned with the variable frequency source to produce variable frequency side bands, one of which is swept through the sample under analysis to produce successive resonance therein. At resonances of a group of gyromagnetic bodies contained within the sample under analysis the side band excited resonance signal is passed through amplifier 38 and delay 39 and applied to the input of amplifier and detector 45 wherein it is amplified and detected to produce a difference frequency component.

The difference frequency component is then applied to the input of a frequency discriminator 46 wherein it is compared with a signal derived from the variable frequency source 42 to produce a D.C. signal corresponding to resonance of the sample under analysis. The D.C. resonance signal is then fed to the input of an indicator and recorder 47 wherein it is recorded as a function of the signal derived from the sweep generator 43 to produce a spectrum of the sample of matter under analysis.

The method and apparatus of the present invention provides an extremely stable system as both the reference gyromagnetic bodies and the bodies under analysis are subjected to substantially identical fluctuations in the polarizing magnetic field and other variations in environment such that substantially no relative changes are encountered in the resonant frequencies of the various groups of gyromagnetic bodies.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of producing a stable gyromagnetic resonance signal from a sample group of gyromagnetic bodies including the steps of, immersing a control group of gyromagnetic bodies and a sample group of gyromagnetic bodies having different resonant frequencies in a common polarizing magnetic field subject to minute random intensity fluctuations with time, simultaneously applying two alternating magnetic fields at different frequencies commonly to both said control and sample groups of gyromagnetic bodies to excite gyromagnetic resonance of said control and sample groups of gyromagnetic bodies such that both groups are simultaneously subjected substantially alike to the minute random frequency fluctuations, if any, of the common A.C. fields, automatically controlling through the intermediary of the control group of gyromagnetic bodies the gyromagnetic ratio of the frequency of the common A.C. fields to the intensity of the polarizing magnetic field to sustain resonance of the control group of gyromagnetic bodies whereby said fluctuations in the applied gyromagnetic ratio conditions of frequency and field intensity are compensated, to thereby provide gyromagnetic resonance signals substantially free of the effects of said fluctuations, simultaneously receiving gyromagnetic resonance signals of the control and sample groups at the different resonant frequencies in one receiving structure coupled to the control and sample groups of gyromagnetic bodies, and separating the sample resonant signal from the control resonant signal as received in the one receiving structure.

2. A method according to claim 1 including the step of juxtapositioning the control and sample groups of gyromagnetic bodies in the common polarizing magnetic field and in the common A.C. magnetic fields.

3. The method according to claim 1 including the step of juxtapositioning the control and sample groups by physically intermixing the control and sample groups whereby they occupy substantially the same region of polarizing magnetic field and applied A.C. magnetic fields.

4. The method according to claim 1 including the step of juxtapositioning the control and sample groups of gyromagnetic bodies in the polarizing magnetic field by physically separating the control and sample groups of gyromagnetic bodies into separate concentric axially coextensive regions of space within the common polarizing magnetic field.

5. The method according to claim 2 including the steps of, making one of the applied alternating magnetic fields variable in frequency with a substantially lower frequency than the other applied A.C. magnetic field, sweeping the frequency of the lower frequency variable frequency A.C. magnetic field, and applying the swept lower frequency A.C. magnetic field to the sample group of gyromagnetic bodies to produce a swept sideband resonance thereof, whereby the received gyromagnetic resonance signal of the sample group of gyromagnetic bodies contains spectral resonance information regarding the sample group of bodies obtained by sweeping the sideband through resonance of the sample group.

6. The method according to claim 5 including, the step of electrically comparing the applied swept low frequency magnetic field component of the swept frequency sideband signal with the detected sample resonance signal to produce a second sample resonance electrical signal which fluctuates in variable accordance with resonance of the sample.

7. Apparatus for producing a stable gyromagnetic resonance signal from a sample group of gyromagnetic bodies including, means for immersing a control group of gyromagnetic bodies and the sample group of gyromagnetic bodies in a common polarizing magnetic field subject to minute random intensity fluctuations with time such that both groups of gyromagnetic bodies will be subjected to substantially the same minute random intensity fluctuations of the polarizing magnetic field, means for providing a source of two A.C. magnetic fields at different frequencies, means for applying the two A.C. magnetic fields at different frequencies simultaneously and in common to both the control and sample groups of gyromagnetic bodies to excite simultaneous gyromagnetic resonance of the control and sample groups of gyromagnetic bodies at different resonant frequencies such that both groups of gyromagnetic bodies are subjected substantially alike to minute random frequency fluctuations of the common A.C. fields, means operative through the intermediary of the control group of gyromagnetic bodies for automatically controlling the gyromagnetic ratio of the frequency of the A.C. magnetic fields to the intensity of the polarizing magnetic field to sustain resonance of said control group of gyromagnetic bodies whereby said fluctuations in the applied gyromagnetic ratio conditions of frequency and field intensity are compensated, to thereby provide gyromagnetic resonance signals substantially free of the effects of said fluctuations, means for simultaneously receiving the gyromagnetic resonance signals of the control and sample groups at different resonant frequencies in one A.C. field receiving structure coupled to the resonant fields of both the control and sample groups of gyromagnetic bodies, and means for separating the sample resonance signal from the control resonance signal as received in said one receiving structure.

8. The apparatus according to claim 7 including means for sweeping the frequency of one of the applied A.C. magnetic fields to produce successive time displaced resonance of the certain different gyromagnetic groups, if any, within the sample group, whereby an extremely stable and accurate resonance spectrum of the sample is obtained.

9. The apparatus according to claim 7 wherein said means for providing a source of two A.C. magnetic fields includes, means for producing one variable frequency A.C. magnetic field having a substantially lower frequency than the other A.C. magnetic field, means for sweeping the frequency of the lower frequency variable frequency A.C. magnetic field, and means for applying the swept lower frequency A.C. magnetic field to the sample group of gyromagnetic bodies to produce a swept sideband resonance thereof, whereby the received gyromagnetic resonance signal of the sample group of gyromagnetic bodies contains spectral resonance information regarding the sample group of bodies obtained by sweeping the sideband through resonance of the sample group.

10. The apparatus according to claim 7 wherein said means for immersing the control group and the sample group of gyromagnetic bodies physically intermixes the control and sample groups of gyromagnetic bodies, whereby the sample and control groups occupy substantially the same region of polarizing field.

11. The apparatus according to claim 7 wherein said means for immersing the control and sample groups of gyromagnetic bodies in the polarizing magnetic field provides separate concentrically disposed compartments one of said compartments containing the sample group of gyromagnetic bodies and the other of said compartments containing the control group of gyromagnetic bodies.

12. Apparatus according to claim 7 wherein said means for providing a source of two A.C. magnetic fields includes, means for producing one of the A.C. magnetic fields with a low frequency audio component substantially lower than the frequency of the other A.C. magnetic field, means for sweeping the frequency of the lower frequency A.C. magnetic field as applied to the sample group of gyromagnetic bodies to produce a variable frequency R.F. sideband A.C. magnetic field at the sample group of gyromagnetic bodies to produce resonance thereof, whereby the received gyromagnetic resonance signal of the sample group of gyromagnetic bodies contains spectral resonance information regarding the sample group of bodies obtained by sweeping the sideband R.F. magnetic field.

13. The apparatus according to claim 12 including, a phase sensitive detector for electrically comparing the low frequency audio component of the R.F. frequency sideband A.C. magnetic field with the received sample resonance signal to produce a second resonance electrical signal fluctuating in variable accordance with resonance of the sample group of gyromagnetic bodies.

14. The apparatus for producing stable gyromagnetic resonance spectra from a group of sample gyromagnetic bodies including; means for immersing a control group of gyromagnetic bodies and the sample group of gyromagnetic bodies in a common polarizing magnetic field subject to the same minute random intensity fluctuations with time; means for providing a source of two A.C. magnetic fields at different frequencies; means for applying the two A.C. magnetic fields at different frequencies simultaneously and commonly to both the control and sample groups of gyromagnetic bodies to excite gyromagnetic resonance of the control and sample groups of gyromagnetic bodies whereby both the groups of bodies are subjected substantially alike to minute random frequency fluctuations of said common A.C. magnetic fields including, an A.C. amplifier, input and output electrical circuits connected to said amplifier, said input and output circuits being regeneratively coupled together through the intermediary of the control group of gyromagnetic bodies to form an oscillator for automatically controlling the frequency of said A.C. magnetic fields to automatically control the applied gyromagnetic ratio of the frequency of the applied A.C. magnetic fields to the intensity of the polarizing magnetic field, whereby said fluctuations in the applied gyromagnetic ratio conditions of frequency and field intensity are compensated, to thereby provide gyromagnetic resonance signals substantially free of the effects of said fluctuations; means for simultaneously receiving the gyromagnetic resonance signals of the control and sample groups at different resonant frequencies in one A.C. field receiving structure coupled to the resonant fields of both the control and sample groups of gyromagnetic bodies; means for separating the sample resonance signal from the control resonance signal as received in said one receiving structure, whereby the sample resonance signal is free of the random fluctuations in both said polarizing magnetic field intensity and the frequency of said A.C. magnetic fields; and means for sweeping the frequency of one of the applied A.C. magnetic fields relative to the other A.C. magnetic field to produce successive time displaced resonances of the certain different gyromagnetic groups, if any, within the sample group, whereby an extremely stable and accurate resonance spectrum of the sample is obtained which is free of the random fluctuations in both the polarizing magnetic field intensity and the frequency fluctuations of said A.C. magnetic field.

15. The apparatus according to claim 14 wherein said means for sweeping the frequency of one of the applied A.C. magnetic fields relative to the frequency of the other applied A.C. magnetic field includes, means for deriving from said A.C. source a variable frequency R.F. sideband A.C. magnetic field having a lower frequency audio component, the derived R.F. sideband A.C. magnetic field being subject to substantially the same minute random frequency fluctuations as the other applied A.C. magnetic field, means for sweeping the frequency of the variable frequency R.F. sideband A.C. magnetic field by sweeping the frequency of the lower frequency audio component, means for applying the A.C. R.F. sideband magnetic field to the sample group of gyromagnetic bodies to produce resonance thereof; and a phase sensitive detector for electrically comparing the swept lower frequency audio component of the applied R.F. frequency sideband A.C. magnetic field with the detected sample resonance signal to produce a D.C. resonance electrical signal fluctuating in variable accordance with resonance of the sample group of gyromagnetic bodies.

References Cited in the file of this patent

UNITED STATES PATENTS

| | | |
|---|---|---|
| 2,589,494 | Hershberger | Mar. 18, 1952 |
| 2,837,649 | Hershberger | June 3, 1958 |
| 2,912,641 | Ruble | Nov. 10, 1959 |

FOREIGN PATENTS

| | | |
|---|---|---|
| 672,156 | Great Britain | May 14, 1952 |
| 745,873 | Great Britain | Mar. 7, 1956 |

OTHER REFERENCES

Berl: Physical Methods in Chemical Analysis, vol. 3, pub. Nov. 19, 1956, by Academic Press, New York (pp. 352–355 relied on).

Shoolery et al.: The Journal of Chemical Physics, vol. 23, No. 5, May 1955, pp. 805–811.

Morin: The Journal of Physical Chemistry, vol. 60, No. 11, 1956, pp. 1594–1596.

Anderson: Physical Review, vol. 102, No. 1, April 1956, pp. 151–166.

Arnold: Physical Review, vol. 102, No. 1, April 1956, p. 136.

Williams: Physica XVII, No. 3–4, March-April, 1951, pp. 454–460.

Smaller: Physical Review, vol. 83, No. 4, August 1951, pp. 812 to 820.